United States Patent [19]

Hiersig et al.

[11] 4,309,914
[45] Jan. 12, 1982

[54] CONTROLLED TRANSMISSION SYSTEM

[75] Inventors: Heinz M. Hiersig, Düsseldorf; Herbert Wedler, Witten, both of Fed. Rep. of Germany

[73] Assignee: Mannesmann Aktiengesellschaft, Düsseldorf, Fed. Rep. of Germany

[21] Appl. No.: 971,405

[22] Filed: Dec. 20, 1978

[30] Foreign Application Priority Data

Dec. 23, 1977 [DE] Fed. Rep. of Germany ....... 2758555

[51] Int. Cl.³ .................... F16H 37/06; F16H 57/10; B63H 23/18
[52] U.S. Cl. ........................................ 74/15.4; 74/661; 74/665 A; 74/665 F; 74/768; 440/3; 440/4; 440/75
[58] Field of Search .............. 74/661, 665 D, DIG. 8, 74/768, 665 A, 665 F, 665 GA, DIG. 2; 115/76, 900; 440/3, 4, 75

[56] References Cited

U.S. PATENT DOCUMENTS 1,332,631 3/1920 Morse .................................. 115/900
3,136,180 6/1964 Sprague et al. ...................... 74/768
3,225,732 12/1965 Carlsen .................................. 115/76

FOREIGN PATENT DOCUMENTS 410031 5/1934 United Kingdom ................ 115/900
2010992 7/1979 United Kingdom ................ 74/768

Primary Examiner—Allan D. Herrmann
Attorney, Agent, or Firm—Smyth, Pavitt, Siegemund & Martella

[57] ABSTRACT

A ship drive system with main engine, main transmission and propeller shaft is supplemented by a transmission branch permitting power transmission in both directions. The branch includes an auxiliary engine, an a.c. generator selectively connected to that auxiliary engine and a controlled transmission unit interposed between the generator shaft and a branch shaft from the main transmission. The unit includes two planetary gear sets of different transmission ratios, their sun gears are mounted on the generator shaft, and a common spider for two sets of planet gears is mounted on the branch shaft; the two internal ring gears for the planetary gears are selectively, one at a time or none, immobilized for power transmission at the respective speed ratio.

8 Claims, 2 Drawing Figures

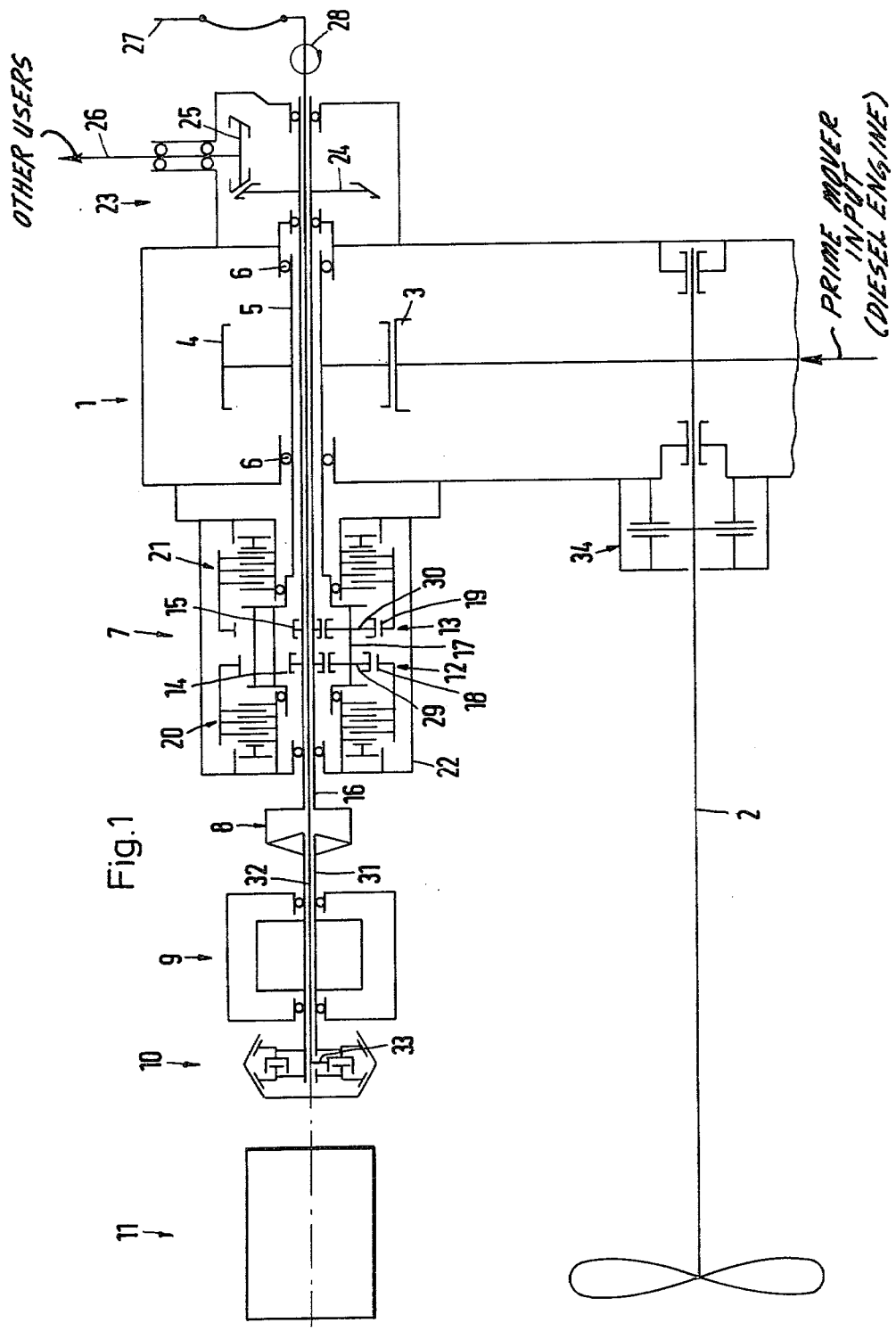

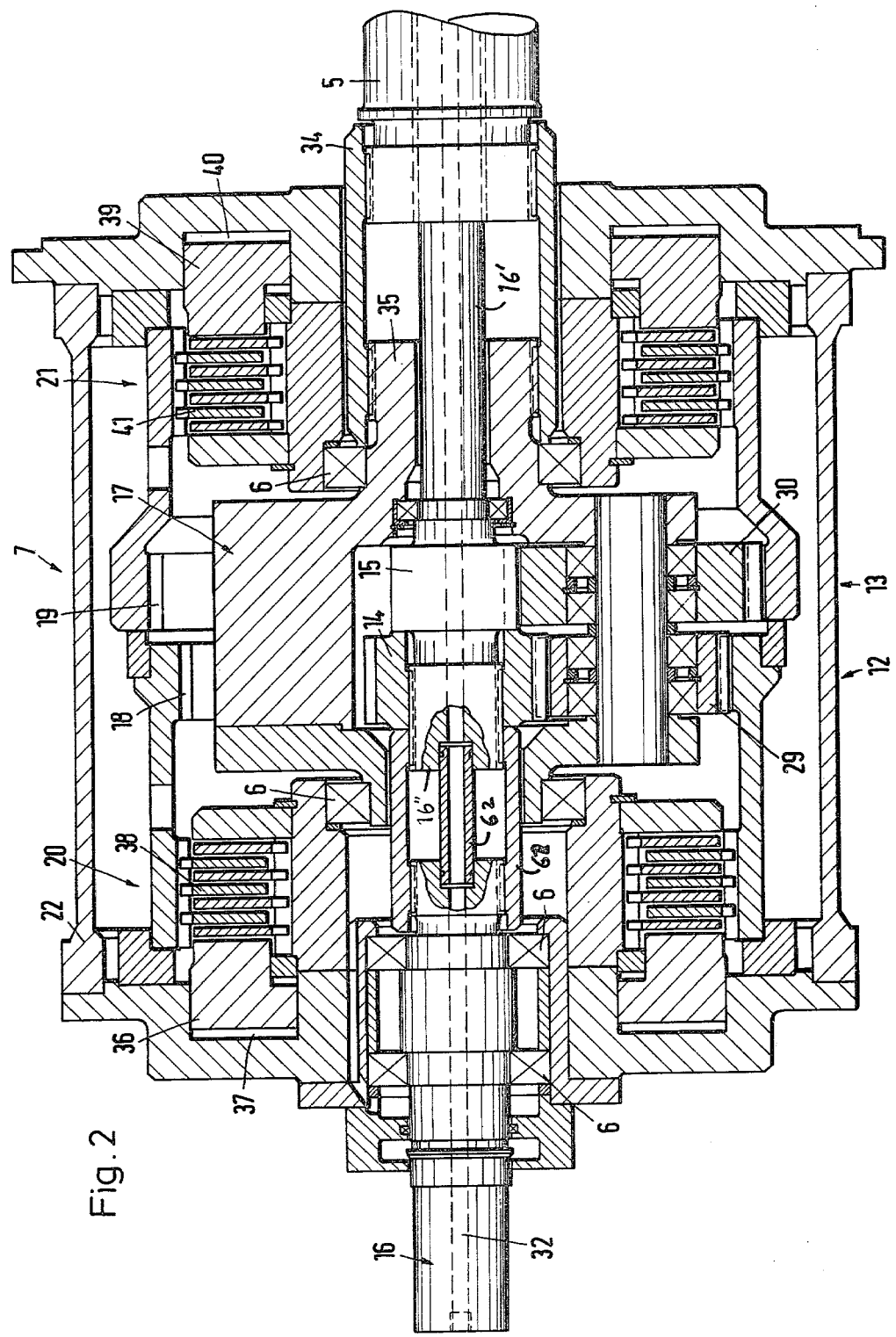

CONTROLLED TRANSMISSION SYSTEM

BACKGROUND OF THE INVENTION

The present invention relates to a two stage gear shifting apparatus particularly and for example for transmissions in drive systems for ships.

It is known generally to branch off power from the main engine of a ship for purposes of driving secondary users. These secondary users, however, become dependent upon the rpm the main engine happens to have and to run in any instant. In some cases, this is of no importance. For example, a water pump as secondary user, providing cooling water for the engine, may indeed pump less water when the engine runs at a lower speed. However, the situation is quite different in other cases, such as an a.c. generator which must run at a constant rpm. Devices are known which cause such a generator to be driven at a constant speed even though the speed of the prime move varies significantly. However, the equipment needed here is quite complex and expensive, particularly if the power transfer to the generator is rather high.

The latter problem should be considered in greater detail. For normal cruising speed of a ship, its Diesel engines will indeed, or can be expected, to run at a speed which is sufficiently constant for the direct operation of an a.c. generator. In other words, relatively little is involved to normally run the ship's engine at a commensurate constant speed, which is desirable from the point of view of the ship's propulsion anyway. However, when the ship maneuvers through narrow waters, e.g. in a harbor, the engine speed is often considerably reduced, e.g. by one third, for reasons of safety. Thus, one will now need a transmission which is superimposed to increase again the effective speed to be applied to the generator. In other words, there is a need for a transmission to be interposed, if the engine speed is reduced.

DESCRIPTION OF THE INVENTION

It is an object of the present invention to provide a new and improved controlled transmission for use in a ship drive system, permitting particularly driving a generator from the main engine of the ship even though the latter may operate at different speeds.

In accordance with the preferred embodiment of the invention, a controlled transmission is suggested which has a stationary case into which lead two shafts. The case contains two planetary gear sets of different transmission ratios. The two sun gears are connected to one shaft and the carriers for the planet gears are connected to the other shaft; the carriers are preferably of uniform construction. The two ring gears are selectively connectable to the case by means of clutches, one at a time (or none), the other one idling accordingly. Power is transmitted through that planetary gear whose ring gear is held to the case, and the transmission ratio is determined accordingly.

As far as application to a ship drive system is concerned, the high speed shaft can be connected to a generator and the low speed shaft is connected to the main transmission gear which is driven by the main ship's engine, and from which power is taken for the propeller shaft. An auxiliary engine may be selectively connectable to the high speed shaft by means of a pressure medium operated clutch. The inventive system includes provisions for feeding pressure medium to that clutch which is rather difficult to achieve.

Such a system permits the generator to be operated at constant speed regardless of whether or not the main engine runs at high or low speed, or if power is taken from the auxiliary engine instead.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a schematic view of a transmission system for a ship in which the inventive controlled transmission is included; and FIG. 2 is a cross-section through the controlled transmission taken by itself.

Proceeding now to the detailed description of the drawings, FIG. 1 illustrates a part of a ship's drive system, particularly for driving a propeller shaft 2. That shaft is directly driven by and from a main transmission 1, which includes a relatively large gear 3. Axial forces of shaft 2 are taken up by thrust bearings 34.

Gear 3 is driven via another gear on gear stage (not shown), which in turn is driven by the main Diesel engine of the ship which is also not shown. That portion of the system, i.e. the engine-transmission-propeller shaft main subsystem is conventional. The main object under consideration is to drive and to run, for example, an a.c. generator 9 at a constant speed, even though the ship's propulsion varies in speed.

A pressure medium operated clutch 10 permits selective coupling of the generator 9 to an auxiliary engine 11, as electric power may have to be generated even if the main engine has stopped. The drive input side of the clutch 10 is connected to that auxiliary Diesel engine accordingly. The driven output side of the clutch 10 is connected to a hollow shaft 31, which is the principal shaft of the generator 9. This shaft, as well as others, infra, are traversed by a duct 32 which may be just the bore in the shaft; it rotates with the shaft. A supply 27 of a pressure medium, e.g. pressurized air, is fed to this duct 32 via a suitable coupler 28. This way, pressurized air is fed to an inlet bore 33 of clutch 10. Thus, an axial feed system for the clutch 10 is provided to selectively connect auxiliary engine 11 to generator 9 or disconnect these devices from each other.

Whenever the main engine runs, generator 9 is to tap power therefrom, and particularly from and through main transmission 1. The auxiliary engine 11 does not run when the main engine runs, though that is well possible. In order to run generator 9 from the main engine, a two stage transmission-clutch combination 7 is interposed which is the principal device of interest here. The controlled transmission unit 7 is coupled to the main transmission 1, as far as structure and mounting is concerned, but also with regard to a rotational input-/output.

The main transmission 1 includes a spur gear 4, which is driven by large gear 3 and is mounted on a hollow shaft 5 which, in turn, is journalled in the case or housing of the transmission 1 by means of bearings 6. It should be mentioned that small circles generally illustrate in FIG. 1 various bearings. Shaft 5 is the normal input shaft for unit 7. The output side of unit 7 is connected to an elastic clutch 8, which in turn is drivingly connected to generator 9 via the above-mentioned hollow shaft 31. The input of clutch 8 is connected directly to a hollow shaft 16 and the main function of unit 7 is to couple shaft 5 to shaft 16. One can consider shafts 5 and 16 as parts of that unit 7. Shaft 5 receives shaft 16 and the latter continues the duct or fluid path 32 from pressure source 27 into clutch 10. This fluid path traverses also the elastic coupling 8 as it continues the hollow interior of shaft 16 into shaft 31.

The auxiliary Diesel engine 11 may at times serve as a low speed prime mover. The direction of power transmission is a reversed one in such a case. Shaft 16 will be driven by the engine 11, and unit 7 couples shaft 5 thereto which, in turn, will drive the main transmission gear 1 and propeller shaft 2.

In addition, it should be mentioned that shaft 16 is provided as input shaft for a bevel gear transmission 23 whose output shaft 26 leads to other secondary users such as water pumps. The bevel gear transmission 23 includes meshing bevel gears 24 and 25, mounted respectively on shafts 16 and 26, and rotating therewith.

The two stage gear shift and controlled transmission 7 (see also FIG. 2) is comprised of a housing or case 22 being of drum-shaped configuration. The shaft, or better, shaft means 16 traverse that drum concentrically and in its entirety, while shaft 5 leads coaxially into the drum from one side. FIG. 2 reveals that shaft 16 is not a uniform device but ends inside of unit 7. A coupler 61 as well as a fluid duct 62 provide a continuation and axle portion 16" whose significance will be described shortly. The shaft entering and traversing hollow shaft 5 is, in fact, functionally a continuation of the shaft 16. For reasons of structure differentiation that continuation is denoted 16' in FIG. 2.

The unit 7 includes further first and second gear branches, respectively established by two planet gear sets 12 and 13 of different speed reductions (or increase, depending upon the direction of power transmission). The two planetary gears have, respectively, sun gears 14 and 15, both being connected to and sit on the portion 16" of the shaft means 16. Both gear sets have a common planet carrier or spider 17. One can also say that the two spiders of the two planet gears are structurally combined or, at least, interconnected. This uniform planet carrier has a tubular extension 35 which constitutes a hollow shaft. The shaft or extension 35 is connected to shaft 5 by means of a coupler sleeve 34.

The two planet gear sets 12, 13 are respectively provided with internal ring gears 18 and 19 of differing diameters on account of the different transmission ratios of the two gear sets. These internal ring gears mesh, respectively, with two sets of planet gears such as 29 and 30 being coaxially mounted and journalled in pairs, one per set in each pair, on carrier or spider 17. The planet gears have different diameters and, of course, mesh also with their respective sun gears.

The two internal ring gears 18 and 19 are, respectively, and individually connectable to case 22 by means of clutches 20 and 21. These clutches are of the friction variety and they are operated by a pressurized fluid. Accordingly, each clutch 20 and 21 is, respectively, provided with annular pistons 36 and 39 disposed in piston chambers 37 and 40 of corresponding configuration. Upon pressurizing these chambers, the respective clutch disks 38 and 41 are urged towards each other to activate the respective clutch and to couple the respective ring gear to casing 22. Thus, the function of the clutches are to immobilize the respective internal ring gear or to permit them to idle.

The supply of pressure fluid to the chambers is not shown and is conventional. Problems do not arise because case 22 is stationary, and is, in fact, structurally combined with the housing for the main gear 1 (see FIG. 1). The system as described operates as follows, and in one of four different operating states or modes.

The first state to be considered is normal cruising. In this case, clutch 20 is energized and pulled in while clutch 21 remains de-energized. The main engine runs to drive transmission 1, but auxiliary engine 11 is stopped. Thus, power is transmitted by the main engine to the propeller shaft 2, and transmission 1, gear 4, branches off a portion of that power by driving the shaft 5. Shaft 5 is now drivingly connected to shaft 16 by means of planetary gear set 12 in the following manner. The shaft 5 drives common carrier 17, and the planet gears 29 mesh in the stationary and immobilized ring gear 18. Thus, these planet gears as they revolve and mesh gear 18, drive their associated sun gear 14 which, in turn, drives shaft 16 in accordance with the transmission ratio (stepped up speed) of the gear set 12.

The resulting rotation of shaft 16 is also transmitted upon sun gear 15 with which the planets 30 mesh. They revolve with the carrier 17 and rotate in accordance with the rotation of shaft 16, so that annular gear 19 will be caused to rotate. No power or torque is transmitted through this branch, except for minimal idling losses. It can thus be seen that the two clutches must not be energized simultaneously.

The clutch 10 is relieved so that motor 9 is driven via the elastic coupling 8 from shaft 16. Also, the auxiliary equipment on shaft 26 is being driven. The speed of shaft 16 is as constant as the speed of the main engine.

The second state or mode to be considered is a slow speed, as needed, for example, for maneuvering the ship through narrow waters. The main engine is presumed to run accordingly at a particular low speed, also being constant. In this instance, clutch 21 is pulled in to connect ring gear 19 of stage 13 to the case 22, while clutch 20 is released. Thus, shafts 16 and 5 are interconnected also in this mode, but the two gear sets 12 and 13 have different transmission ratios so that presently the speed ratio is different from the value it had in mode one. Accordingly, the transmission ratio is increased and since shaft 5 rotates at a lower speed, shaft 16 will rotate at the same speed as in mode one. Gear set 12 idles, clutch 10 is still disconnected, and engine 11 is still stopped.

The third state or mode assumes that the main engine has stopped and a clutch (not shown) has disconnected that engine from transmission 1. On the other hand, engine 11 runs and clutch 10 is energized to drive generator 9 and shaft 16 via coupling 8. Clutch 21 is energized and clutch 20 is de-energized. Accordingly, gear set 12 idles and torque and power is transmitted via gear set 13 from shaft 16 to shaft 5. The speed reduction is relatively large so that shaft 5 rotates relatively slowly. The propeller shaft 2 is now driven via gears 4 and 3. The auxiliary equipment on shaft 26 is driven at the speed of shaft 16.

Conceivably, and from a general point of view, another mode is possible as far as unit 7 is concerned, in which the clutch 20 is energized and 21 is de-energized, while engine 11 runs. This would impart high speed upon the propeller shaft 2 which may not be possible on account of the power rating. However, if a clutch disconnects, for example, gear 4 from the shaft 5, a secondary user requiring high speed may be driven in this instance.

The fourth state and mode calls for stopping the ship. Both clutches 20 and 21 are released and de-energized, but engine 11 runs to drive the generator 9 as well as shaft 16 for running the auxiliary equipment on shaft 26. The two sun gears 14 and 15 run, but shaft 5 is, in fact, held by the immobilized propeller. Thus, the carrier 17 is at rest and the rotating but not revolving planet gears drive their respective ring gears which idle, because clutches 20 and 21 do not connect either of them to the stationary case 22.

The invention is not limited to the embodiments described above but all changes and modifications thereof not constituting departures from the spirit and scope of the invention are intended to be included.

We claim:

1. In a ship's drive system, having a main engine and a propeller driven by the engine, a controlled transmission, comprising:
    a stationary case;
    an electric generator;
    a first shaft connected to the generator; a second shaft, said first shaft and said second shaft leading into the case;
    a first and second planetary gear set of different transmission ratios, each having a sun gear, planet carrier means, planet gears, and internal ring gears, the two sun gears being mounted to the first shaft, the two planet carrier means being mounted to the second shaft;
    first and second clutch means disposed and configured for respectively connecting the internal ring gears to said case, at least one of the first and second clutch means being always deenergized, permitting idling of the respective one of the ring gears; and
    gear means including a transmission gear for connecting said second shaft to said propeller.

2. A system as in claim 1, including an auxiliary engine and clutch means for connecting the auxiliary engine to said first shaft, so that the controlled transmission can transmit power from the first to the second shaft or vice versa.

3. The transmission as in claim 1 or 2, wherein the second shaft is hollow and coaxially traversed by the first shaft, there being additional power driven means connected to said first shaft.

4. The transmission as in claim 1 or 2, including means for selectively operating either of the shafts as drive shaft and the respective other one as driven shaft; pressure fluid operated clutch means on the first shaft, said first shaft being hollow; and means for supplying pressure fluid to said clutch means through said hollow first shaft.

5. A power transmission system, comprising in combination an auxiliary engine;
    a clutch driven by the engine and having an output shaft;
    a generator on the output shaft, the shaft being continued beyond the generator;
    a pair of sun gears on the continued shaft;
    a planet carrier means carrying two sets of planet gears respectively meshing with the sun gears of the pair;
    driver or drive shaft means connected to the carrier means;
    two annular internal gears respectively meshing with the sets of planet gears; and
    controlled clutch means for immobilizing one or the other or none of the internal gears.

6. A system as in claim 5, said drive or drive shaft means being connected to another engine.

7. A system as in claim 6, including a ship's propeller driven by the other engine, or by said auxiliary engine via said output shaft and said shaft means.

8. A system as in claim 5, including axial fluid feed means traversing the shaft as continued, and the generator for providing operating fluid to said clutch.

* * * * *